ial Internal Organs, vol. X, 1964, 446 pp., pages 69-73 relied on.

United States Patent

[11] 3,616,927

| [72] | Inventor | William McClements Muir Rhu, Scotland |
| [21] | Appl. No. | 808,236 |
| [22] | Filed | Mar. 18, 1969 |
| [45] | Patented | Nov. 2, 1971 |
| [73] | Assignee | National Research Development Corporation London, England |
| [32] | Priority | Mar. 20, 1968 |
| [33] | | Great Britain |
| [31] | | 13,491/68 |

[54] SEMIPERMEABLE MEMBRANES
6 Claims, 1 Drawing Fig.

[52] U.S. Cl. .................................................. 210/321, 210/500
[51] Int. Cl. ................................................... B01d, 39/16, B01d 31/00
[50] Field of Search ........................................ 210/22, 23, 321, 500

[56] References Cited
UNITED STATES PATENTS

| 3,083,118 | 3/1963 | Bridgeford | 117/47 |
| 3,220,960 | 11/1965 | Wichterle | 260/2.5 |
| 3,342,328 | 9/1967 | Swenson | 206/63.2 |
| 3,386,912 | 6/1968 | Lazare | 210/22 |

FOREIGN PATENTS

| 872,217 | 7/1961 | Great Britain | 210/500 |

OTHER REFERENCES

Day et al., " Combination Membrane Oxygenator-Dialyzer," from Transactions of the American Society for Artificial Internal Organs, vol. X, 1964, 446 pp., pages 69- 73 relied on.

*Primary Examiner*—Frank A. Spear, Jr.
*Attorney*—Jacobs and Jacobs

ABSTRACT: Membranes for extracorporeal haemodialysis are prepared from copolymers of n-butyl methacrylate (55 to 75 percent) and acrylic acid (45 to 25 percent) prepared by portionwise addition of reactants to a reactor. These have superior transfer properties for urea, creatinine, uric acid and other blood components as compared with cellulosic membranes, and are prepared as blood envelopes for use in Ross-Muir and other dialyzers.

PATENTED NOV 2 1971
3,616,927
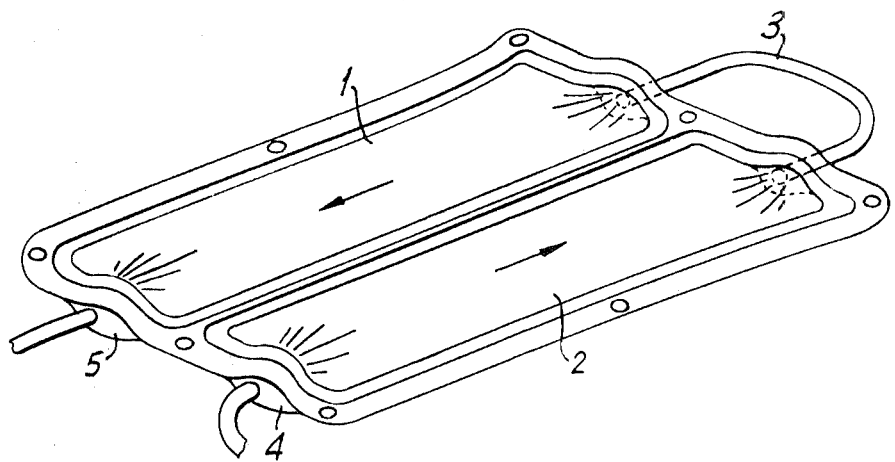
INVENTOR
WILLIAM McCLEMENTS MUIR
BY: *Jacobs & Jacobs*
ATTORNEYS

SEMIPERMEABLE MEMBRANES

This invention relates to semipermeable membranes and is particularly concerned with new membranes suitable for use in extracorporeal haemodialysis.

Extracorporeal haemodialysis is a technique now available for the treatment of patients suffering from acute or chronic renal failure and is being used successfully in many renal failure patients. Many designs of the so-called "artificial kidney" have been proposed and all designs fundamentally comprise a clinically acceptable dialysis machine having a blood zone and a dialyzate fluid zone separated from each other by a semipermeable membrane. Blood from the patient's body is passed through the blood zone of the "artificial kidney" and impurities present in the blood are able to pass through the membrane driven only by concentration gradient into the dialyzate fluid which usually runs to waste or is sometimes recirculated while the purified blood is passed back to the patient.

To be clinically acceptable for use in such "artificial kidneys," the membrane must conform to a very closely defined specification. The requirements for an acceptable membrane include adequate transport rate of each of the various blood toxins across the membrane, lack of permeability towards desired blood components which otherwise have to be replaced after haemodialysis, adequate mechanical strength and stability, etc., under operating conditions and, of course, lack of toxicity and thrombogenicity.

It is extremely difficult to find a membrane which fulfills all the above requirements and, although extracorporeal haemodialysis has been available for routine clinical use for many years, only one type of membrane material has even approached the properties required, this being the cellulosic membrane known under the Registered Trade Marks "Cellophane" and "Cuprophane."

One of the main disadvantages of the cellulosic membranes is that the rate at which the major blood toxins pass through them is still too slow, and colored high molecular weight compounds such as urochrome and bilirubin in the 2,000 –3,000 molecular weight range, which cause discoloration in the chronic renal failure patient by slow deposition in the tissues, are virtually not removed with "Cellophane" films. As a consequence, "artificial kidneys" using them must be very large so as to present a large surface area of membrane, and present handling difficulties. As a further consequence, the time taken to cleanse the blood of a patient with renal failure tends to be prolonged, namely, about 12-14 hours on two or three occasions a week for an average patient on a standard Kiil kidney. If the dialyzate rate could be increased, the advantages to the patient would be considerable and the size of existing equipment could be reduced.

A further major disadvantage of the available cellulosic membranes is that they are not heat sealable. According to present clinical practice, it is very important to prevent the patient's blood from coming into contact with any permanent nondisposable part of the "artificial kidney" and we have developed a form of "blood envelope" from a double layer of the membranes so that blood comes into contact with membrane surfaces only and inlet and outlet lines which are usually unplasticized polyvinylchloride tubes. Because cellulosic membranes are not heat sealable, mechanical seals would have to be formed between the membrane sheets to prevent blood loss and to affix the inlet and outlet ports in the blood envelope. If a heat-sealable membrane were available, it would be possible to manufacture a perfectly fluidtight blood envelope provided with inlet and outlet ports, which could be sterilized at the manufacturing stage, which could be inserted in the haemodialyzer far more easily than the present mechanically sealed sheets and which could be disposed of after use with much less risk of spread of infectious hepatitis or of other health hazard to patients and operators who assemble and service machines.

It has now been found possible to prepare heat-sealable or solvent-sealable membranes from certain novel acrylic copolymers which can be readily cast as semipermeable membranes having a combination of properties which render them particularly suitable for use in extracorporeal haemodialysis.

The present invention comprises a membrane-forming copolymer of n-butyl methacrylate and acrylic acid. Polymers which can produce membranes having properties superior to those of the cellulosic membranes may be obtained by copolymerizing from 55 to 75 percent of n-butyl methacrylate with from 45 to 25 percent of acrylic acid, the proportions being expressed by weight of the total monomer, but by far the best improvement in properties is obtained if the acrylic acid is present in excess throughout the reaction. Thus preferred polymers are those obtained by reacting from 55 to 65 percent of the n-butyl methacrylate with from 45 to 35 percent of the acrylic acid, optimum results being obtained when 60 percent of the former is reacted with 40 percent of acrylic acid.

Excellent film-forming, polymers of molecular weight 500,000 and above may be obtained as described hereinafter which yield membranes having the following mass transfer rates, corrected to 0.001 inch thickness, when measured in the Ross-Muir dialyzer:

| | | |
|---|---|---|
| urea | at least 1.5 | e.g. 1.5–5 |
| creatinine | at least 0.5 | e.g. 0.5–5 |
| uric acid | at least 0.2 | e.g. 0.2–0.8 | the figures being expressed as gram-moles $\times 10^{1}3$/meter$^2$ min. mil.

The reaction may be carried out by solution polymerization techniques, e.g., in dioxane, dimethyl formamide, and tetrahydrofuran, but the monomers are preferably copolymerized in an aqueous system, conveniently by emulsion polymerization techniques in the presence of a peroxidic catalyst, and it is important that monomers be added to the polymerization reactor portionwise. For example, it is convenient to add on each occasion somewhere between 1 and 20 percent, preferably between 5 and 20 percent of the total combined weight of monomers. The monomers may be stored in separate reservoirs and a portion added to the emulsion from each reservoir alternatively, always starting with the addition of the hydrophilic monomer, acrylic acid. Operating in this way, 10 percent for example, of the total weight of each monomer may be added on each occasion so that 10 additions are made from each reservoir alternately with appropriate time intervals between each addition to allow polymerization to proceed. Another possibility is to make several additions of small quantities, e.g. 1 percent or less of the total weight, first of the hydrophilic monomer and then of the hydrophobic monomer, n-butyl methacrylate, and to continue in this way until the total quantity of both monomers has been added. Alternatively, 10 additions each of 1 percent of the total weight of hydrophilic monomer can be made to introduce a total of 10 percent of hydrophilic monomer followed by 10 additions each of 1 percent of the hydrophobic monomer to introduce a total of 10 percent of hydrophobic monomer and this procedure may be followed until all the required monomer is added. This method approaches slow continuous addition of the monomers. A further possibility is to mix the monomers immediately prior to polymerization and then to make repeated additions to the emulsion in the reactor to which catalyst is added periodically.

It is preferred to phase the additions of monomer over a period of time so that each portion of monomer added to the emulsion has an opportunity to polymerize before the next portion of monomer is added. The time interval depends to some extent on the scale of polymerization, but is usually from 5 to 20 minutes. By way of example, when a total of 100 to 500 g. of monomer is polymerized, addition of from 10 to 20 portions can be made over a period of 60 to 120 minutes.

Emulsion polymerization is frequently carried out under reflux conditions but it is found that for the production of satisfactory haemodialysis membranes, it is better to conduct this polymerization below the reflux temperature and preferably below 65° C. measured in the gas space just above the surface of the reactants. The copolymerization itself is slightly exothermic and advantage may be taken of this to maintain the reaction temperature between 40° and 65° C., preferably between 45° and 60° C. measured as indicated and although the mixture temperature may reach 80° C. on occasion it should not reflux. The course of the reaction can be followed by monitoring the temperature changes in the emulsion and also by observing viscosity changes in the emulsion. When 60 to 120 minutes elapses while 100 to 500 g. of monomer is added to an emulsion, the reactants may be retained in the polymerization vessel for perhaps a further 2 to 3 hours to ensure that the polymerization is substantially complete before the polymer is recovered from the emulsion.

As mentioned above, the monomers are conveniently copolymerized under emulsion polymerization techniques which, subject to the discussion above regarding temperature and monomer proportions and addition sequence, may be operated under conventional conditions. Thus, as emulsifying agent, one of the alkyl sulfonates, e.g. sodium dodecyl sulfate, may be used in an amount of 0.5–1 percent by weight based on the initial weight of water used. Higher proportions of emulsifying agent e.g. up to 8 percent may be used but little advantage is gained over about 4 percent. As catalyst, an aqueous solution of peroxidic compound, e.g. potassium persulfate may be added before and/or during the polymerization.

Copolymer may be recovered from the emulsion by conventional methods and cast or otherwise formed into sheets to form a membrane of the desired thickness. Copolymer solvent may be used to break the emulsion and recover the copolymer in solution, solvents that may be used include dimethylformamide, dimethylacetamide, dimethylsulfoxide, methylene dichloride and chloroform or acetone. Alternatively in certain instances the copolymer may be precipitated from the emulsion by addition of an inorganic salt such as calcium chloride, calcium sulfate or magnesium sulfate and the precipitated polymer filtered off, washed and even dialyzed against tap water using a "Cellophane" membrane prior to drying and dissolving the copolymer in the solvent.

The concentration of copolymer in the solvent can be adjusted to about 2.5 to 20 percent w/v and this solution then cast on to plates to form a sheet of copolymer which can be used as a haemodialysis membrane. The wet thickness of cast solution is preferably 0.010 to 0.020 inch and this thickness can be adjusted using a doctor blade over the plate or by adjusting the concentration of the copolymer in the solvent to give membrane of dry thickness between 0.0006 and 0.002 inch.

Membrane is finally removed from the plate, washed thoroughly to remove any unreacted monomer which may be present and then dried. The membrane is then ready to be cut and shaped into the necessary form to fit the artificial kidney in question and can be heat sealed to form a blood envelope into which the blood inlet and outlet ports are sealed. A blood envelope of this type may be sterilized and stored in a sterilized package so that it can be withdrawn and immediately inserted into an "artificial kidney" machine without further sterilization being necessary. The risk of contaminating the permanent structure of the kidney machine with the patients' blood is greatly reduced when such a blood envelope is used.

The invention is illustrated by the following example:
a. Preparation of Copolymer
The following recipe is used:

|  | Parts by Weight | Weight taken (gm.) |
|---|---|---|
| Butyl methacrylate | 60 | 120 (135 ml.) |
| Acrylic acid | 40 | 80 (75 ml.) |
| Water | 200 | 400 |
| Sodium dodecyl sulfate | 0.75 | 1.5 |
| Potassium persulfate | 1 | 2 (g. in 100 ml. water) |
| Pluronic flake | 0.125 | 0.25 |
| Mole fraction acrylic acid = 0.57 | | |
| Mole fraction butyl methacrylate = 0.43 | | |

A three-necked liter reaction flask is set up with 300 ml. water and the sodium dodecyl sulfate dissolved by stirring under a steady flow of nitrogen gas to exclude oxygen.

Monomers and catalyst are added to the reaction flask in the following manner:

Reaction Addition Sequence

| time (mins.) | Acrylic acid (ml.) | Butyl methacrylate (ml.) | Potassium persulfate (ml.) |
|---|---|---|---|
| 0 | 15 | | 10 |
| 5 | | | 10 |
| 10 | | | 10 |
| 15 | | 20 | |
| 20 | 15 | | |
| 25 | | | 10 |
| 30 | | 20 | |
| 35 | | | 10 |
| 40 | 15 | | |
| 45 | | 20 | |
| 50 | | | 10 |
| 55 | | | 10 |
| 60 | 15 | 20 | |
| 65 | | | 10 |
| 70 | | | 10 |
| 75 | | 20 | |
| 80 | 15 | | |
| 85 | | | 10 |
| 90 | | 35 | |

Average temperature of the reaction = 56° C.

b. Preparation of Membrane

After washing and reprecipitation from dimethylformamide, films are cast on glass plates from 10 percent solutions of the copolymer in dimethylformamide. The thickness of the film is controlled by doctor-blading the solution across the plate and it is possible to recover from the plate large sheets of membrane, 10 square feet or even larger if desired, which are pin-hole free and have a substantially uniform thickness between about 0.001 and 0.003 inch.

c. Membrane Characteristics i. The membrane is heat-sealable at about 180° to 250° C. and can be sealed by conventional methods to form a closed envelope having poly-n-butyl methacrylate, p.v.c., or polyethylene inlet and outlet ports located in a fluidtight fixing in the sealed strip.

ii. Exposure tests of the membranes in a static test cell to heparinized fresh pig blood indicate that the membrane does not induce blood leakage, coagulation, platelet adhesion or haemolysis.

iii. The mechanical strength of the membrane has been tested in a dialysis cell in which the membrane is supported on a stainless steel wire mesh and subjected to an increasing pressure differential across the membrane. The mechanical strength of the membrane is of the same order as that of "Cuprophane" which ruptures at 530 to 590 mm. mercury pressure.

iv. Transport characteristics of the membrane are determined with respect to urea, glucose, creatinine and uric acid in the dialysis cell (the Ross-Muir dialyzer) as described in U.S. Pat. No. 3,488,690 issued to Ross and Muir Jan. 6, 1970. The membrane is tested with respect to glucose as an ideal haemodialysis membrane should be, substantially impermeable to glucose; significant loss of blood glucose as occurs when "cuprophane" membranes are used, is clinically undesirable. A solution of the compound at a concentration to simulate its concentration in venous blood is dialyzed against a conventional dialyzate liquid and the $T_{1/2}$ value, the time taken for the initial concentration of the compound to fall by one-half, is determined. This may be compared with a corresponding $T_{1/2}$ value for a "Cuprophane" membrane operating under identical conditions. $T_{1/2}$ values are corrected for thickness variation so that they can be directly compared. The rate measurements or $T_{1/2}$ values are shown in table I both as obtained by test cell data and linearly corrected to a wet film thickness of 0.001 inch. Standard cellulose films used in comparison are 300PT (British Cellophane Ltd.), 150PT, Cuprophane (J. P. Bemberg Aktiengesellschaft, Wuppertal).

TABLE I

FILM PERMEABILITIES $T_{1/2}$ VALUES

|  | 150PT | | 300PT | | BM-AA Copolymer | |
|---|---|---|---|---|---|---|
|  | u | c | u | c | u | c |
| Urea | 106 | 133 | 148 | 93 | 95 | 63 |
| Creatinine | 142 | 176 | 190 | 119 | 80 | 38 |
| Uric acid | 190 | 238 | 410 | 257 | 145 | 97 |
| Glucose | 235 | 292 | 439 | 275 | 290 | 300 |
| Phosphate | 595 | 744 | 815 | 510 | 500 | 400 | u—result uncorrected for film thickness
c—time corrected to 0.001 inch standard film thickness Mass transfer rates for blood poisons have also been calculated based on data obtained from *in vitro* testing of the films in the Ross-Muir and Kiil dialyzers.

The new membrane is much more highly selective towards dialyzable blood poisons and may operate by a mechanism different from that suggested for a cellulose-based film where the permeability rate of diffusing solute is proportional to the molecular volume although it is not intended that we be bound by this explanation as to diffusing mechanism. The higher permeability of this new copolymer appears to be due to a high pore content of the appropriate distribution range and film surface chemisorption of diffusible solutes.

The accompanying drawing shows two dialysis envelopes 1, 2, of membranes in accordance with the invention. The two envelopes are sealed together along one edge and interconnected at one end by external tubing 3. The direction of blood flow is indicated by the arrows. An inlet connection 4 to one envelope and an outlet 5 from the other are provided.

I claim:

1. A haemodialysis membrane derived from a copolymer of n-butyl methacrylate and acrylic acid containing units equivalent to from 55 to 75 percent by weight of n-butyl methacrylate and from 45 to 25 percent by weight of acrylic acid and having mass transfer rates with respect to the following compounds when measured in a Ross-Muir dialyzer and corrected to a membrane thickness of 0.001 inch:

urea: at least 1.5
creatinine: at least 0.5
uric acid: at least 0.2 the figures being expressed as gram-moles $\times 10^3$/meter$^2$ min. mil.

2. A membrane according to claim 1, in which the mass transfer rates are:

urea: 0.5–5
creatinine: 0.5–5
uric acid: 0.2–0.8

3. A membrane according to claim 1 having a thickness of from 0.0006 to 0.003 inch.

4. A membrane according to claim 1 which has been obtained by stepwise addition to a polymerization zone of portions of monomer or portions of mixed monomers not exceeding 20 percent of the total combined weight of monomer.

5. A membrane according to claim 4, having a thickness of from 0.001 to 0.003 inch.

6. A heat-sealed closed envelope provided with an inlet port and outlet port for the transmission of blood through the envelope, formed from a membrane according to claim 1 which is from 0.001 to 0.003 inch thick and which has been obtained by stepwise addition to a polymerization zone of portions of monomer or portions of mixed monomers not exceeding 20 percent of the total combined weight of monomer.